US006409818B1

(12) United States Patent
Johnson

(10) Patent No.: US 6,409,818 B1
(45) Date of Patent: *Jun. 25, 2002

(54) DISPOSABLE WATER RESISTANT FOAMED CONCRETE COVER FOR BULK SALT

(75) Inventor: Philip S. Johnson, Rockford, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/505,473

(22) Filed: Feb. 16, 2000

Related U.S. Application Data

(63) Continuation of application No. 09/129,158, filed on Aug. 5, 1998, now Pat. No. 6,136,430.

(51) Int. Cl.$^7$ .............................. C04B 7/19; B05D 1/02
(52) U.S. Cl. ........................ 106/608; 106/600; 106/602; 106/603; 106/606; 405/266; 405/270; 405/275; 427/426; 427/427; 252/88.1
(58) Field of Search ................................ 428/325, 331, 428/454, 702, 703, 689; 405/266, 270, 275; 427/426, 427; 252/88.1; 106/12, 14.11, 14.41, 600, 602, 603, 606, 608

(56) References Cited

U.S. PATENT DOCUMENTS

| 2,754,623 A | 7/1956 | Mowry et al. ................... 47/1 |
| 3,640,021 A | 2/1972 | Grafmuller ...................... 47/9 |
| 3,943,078 A | 3/1976 | James .......................... 260/17 |
| 4,012,355 A | 3/1977 | Nimerick .................... 260/29.7 |
| 4,071,400 A | 1/1978 | Jankowiak .................. 162/169 |
| 4,076,862 A | 2/1978 | Kobeski et al. ............. 427/136 |
| 4,087,572 A | 5/1978 | Nimerick .................... 427/214 |
| 4,106,296 A | 8/1978 | Leonard, Jr. et al. ........... 61/36 |
| 4,271,231 A | 6/1981 | Hansen et al. .............. 428/323 |
| 4,297,810 A | 11/1981 | Hansford ......................... 47/9 |
| 4,510,180 A | 4/1985 | Cornely et al. ............. 427/136 |
| 4,518,393 A | 5/1985 | Pace et al. ....................... 44/6 |
| 4,551,261 A | 11/1985 | Salihar ........................ 252/88 |
| 5,082,500 A | 1/1992 | Nachtman et al. .......... 106/900 |
| 5,161,915 A | 11/1992 | Hansen ....................... 405/129 |
| 5,256,444 A | 10/1993 | Roe ............................ 427/136 |
| 5,310,494 A | 5/1994 | Bennett ........................ 252/88 |
| 5,399,048 A | 3/1995 | Walker ....................... 405/129 |
| 5,525,009 A | 6/1996 | Hansen ....................... 405/129 |
| 5,595,596 A | * 1/1997 | Marcotullio et al. ........ 106/677 |
| 5,604,168 A | 2/1997 | Libor .......................... 501/141 |
| 5,849,364 A | 12/1998 | Nachtman et al. .......... 427/421 |
| 6,136,430 A | * 10/2000 | Johnson ..................... 428/331 |

* cited by examiner

Primary Examiner—Deborah Jones
Assistant Examiner—Stephen Stein
(74) Attorney, Agent, or Firm—Fitch, Even, Tabin & Flannery

(57) ABSTRACT

The present invention is directed to a composition and method for forming an inexpensive, semi-permanent cured foamed cementitious cover layer over deicing salt which is stored outdoors in large bulk mounds or piles and a salt pile or mound covered with such a layer.

26 Claims, No Drawings

DISPOSABLE WATER RESISTANT FOAMED CONCRETE COVER FOR BULK SALT

This application is a continuation of U.S. Ser. No. 09/129,158, filed Aug. 5, 1998, now U.S. Pat. No. 6,136,430.

FIELD OF THE INVENTION

The present invention generally relates to the covering of bulk salt piles stored outdoors. More particularly, the invention relates to covering bulk salt piles or mounds which are stored outside or outdoors where the salt is waiting to be spread as a deicing composition and where the cover for the salt is a foamed concrete which will easily break up into particulate matter which will spread along with the deicing composition.

BACKGROUND OF THE INVENTION

Millions of tons of deicer salt in the form of sodium chloride, calcium chloride and magnesium chloride is applied in many countries to roads, bridges and sidewalks during the cold winter season to melt ice and snow. Sodium chloride is most commonly used, but all of these salts have to be stored and be ready for transport and spreading at indeterminate times depending upon the weather. Storing deicing salts, such as sodium chloride, outdoors exposed to the elements, however, creates problems. Rain and snow will wet the salt which will solubilize to some extent and then form a hard crust which will cause spreading problems. Rain, snow and wind also will erode the piles. This causes several problems.

The salt pile will spread and require more area for storage. Also the water from the rain and snow will solubilize a portion of the salt and it will be lost as a part of a brine type of run off. But even more important, the aqueous solution of salt which forms the run off is an environmental problem which can contaminate surface water and ground water and will be detrimental to surrounding vegetation.

To solve the aforedescribed problems salt piles have been covered with tarpaulins. In some cases, structures have been built to house the salt, such as "beehive" shaped structures often seen by the roadsides in the northern American Midwest. These solutions, however, are not without drawbacks. The tarpaulins are expensive, heavy and difficult to move. They are also subject to inadvertent ripping and tearing by earth moving equipment loading salt onto spreader trucks. The structures used to house salt are expensive and also prone to inadvertent damage during the movement of the bulk salt.

It is an object of this invention to provide an easy way to cover bulk salt stored outdoors so that it will be protected from rain, snow and wind.

It is an object of this invention to reduce brine run-off from bulk salt stored outdoors.

It is yet another object of this invention to provide a cover for a bulk salt pile or mound that will retain the integrity of the salt pile or mound.

These and other objects, advantages, features and characteristics of the present invention will become more apparent upon consideration of the following description and appended claims.

SUMMARY OF THE INVENTION

The present invention is directed to a foamed composition and method for forming an inexpensive, semi-permanent cover layer over deicing salt which is stored outdoors in large bulk mounds or piles. The cured foamed cover layer protects the salt from moisture, wind and other erosive elements so that the salt can be stored outdoors for extended periods of time without experiencing agglomeration of the salt particles from moisture, erosion or deterioration of the salt mound and without experiencing the deteriorating effects of the elements. The cured foamed cover layer protects the salt by forming a continuous coating over the exposed surface of the salt mound or pile and eliminates or substantially eliminates brine water run off from the pile that would otherwise occur as a result of moisture from the elements solubilizing and then transporting dispersed or solubilized salt from the bulk salt pile. Moreover, the invention has the additional advantage of allowing easy recovery of the salt after some of the salt pile has been removed. As it becomes desirable to remove a volume of salt from beneath the cured foamed cover layer, a portion of the cover layer may be broken and removed as necessary to expose the salt and provide access for its removal. In this way, the remaining portion of the cover layer may be left on the salt until it is desired to remove more of the salt. A cover layer then may be reapplied to cover any areas of the salt pile that are exposed as a result of removing salt from the pile.

Broadly, the cured foamed cover layer formed by the method of the invention comprises cured cement, and in an important aspect, cured concrete which has been foamed with a foaming agent, without any other organic polymeric material which will form a polymeric coating or layer except an optional water resistant/repellant additive. The cured foamed cover layer, which provides a water resistant foamed coating over the salt mound, is of a thickness which is effective for maintaining the integrity of the salt mound for at least a year when exposed to the outdoor elements and which is effective for minimizing passage of moisture to the salt for at least that time. The cured foamed cover composition is brittle and readily broken into particulates which can be spread with the particulate salt, but the cured cover or layer is effective for providing a cover layer over the salt that is a continuous, hardened coating which generally protects the salt from water and keeps the integrity of the mound or pile of bulk salt comprising sodium chloride, calcium chloride, magnesium chloride and mixtures thereof. The cured foamed cover has a density of not more than about 1.6 gram/cm$^3$, and in an important aspect, it has a density in the range of from about 1.4 to about 0.9 gram/cm$^3$ and a strength in the range of from about 28 to about 8 as measured on a Ametex-Accru-Force Cadet Force Gauge as available from Ametek using 0.5 cm chisel.

The cured foamed cover composition is entirely compatible with the end use of the deicing salt. As the deicing salt is used, an amount of the cured cover will be crushed and intermixed with the salt without deleterious effect to the salt. Indeed, the crushed cover will enhance some aspects of the use of the deicing salt because its particles will enhance traction over ice and snow.

In an important aspect, the method of the invention includes applying a foamed cover composition which in its cured form comprises a blend of foaming composition, aggregate, cement and water on the salt mound (especially sodium chloride in the form of rock salt). The cured foamed cover composition comprises from about 2 to about 14 weight percent cement, based upon the weight of the cement, aggregate and other solid components. The amounts of foaming composition, aggregate and water in the uncured foamed cover composition are effective to provide the cured foamed cover composition with a density of from about 1.6 to about 0.9 gr/cm³ and a strength of from about 28 to 8. The aggregate also should not be too fine (not greater than about 10 U.S. standard mesh) to assure that the cover will not be too hard and stay brittle so that the salt can be readily accessed without damage to moving equipment such as front loaders. Larger aggregate causes the concrete to break too easily since the aggregate dimensions will approach or exceed the thickness of the concrete layer. Also keeping the size of the aggregate to not greater than 10 mesh, but not less than 300 mesh (except for fly ash which could have a particle size which is finer than 300 mesh), provides a cover which can be reduced to particulates which are in a size such they can be spread with spreader equipment along with the salt on surfaces with ice and snow. In an important aspect the aggregate is selected from the group consisting of sand, fly ash, silica and mixtures thereof. In general, the cured foamed cover composition will comprise from about 2 to about 14 weight percent cement, from about 97.6 to about 70 weight percent aggregate and from about 0.4 to about 6 weight percent foaming composition.

In an important aspect, the pile or mound of salt is permitted to shift or settle, such as from about 3 to about 7 days before the foamed cover composition is applied to the salt. Thereafter, the foamed cover composition is applied directly to the exposed surface of the salt with an eductor nozzle, hydraulic pump or other conveying equipment. The foamed cover composition is applied in an amount which is effective for maintaining the integrity of the salt mound for at least about one year when exposed to the outdoor elements and which is effective for minimizing passage of moisture to the salt for at least that time, which as a wet slurry is generally, about 1 to about 12 pounds of composition per square foot of the surface of the salt (or 0.5 to about 12 pounds as a dry composition).

To maintain the integrity of the salt pile as aforesaid, the foamed cover composition should be applied to the surface of the salt mound in an amount which is effective for providing a cured layer having a thickness of from about 0.1 to about 1.0 inch, and in an important aspect about 0.5 inch. The aqueous blend which is the foamed cover composition is sprayed onto the salt pile in order to form a solid, essentially impermeable cover layer of foamed concrete after curing. The amount of water used to apply the foamed cover composition should be effective to permit a hydraulic pump and/or an eductor to spread that composition and provide the density and strength described above. The thickness of the cover layer should generally be from about 0.1 to about 1.0 inch, and as noted above, in an important aspect about 0.5 inch. Prior to spraying the foamed cover composition onto the salt, the dry components of the foamed cover composition are mixed with the water and foaming agent to provide an aqueous foamed cover composition which then is sprayed as a slurry over the exposed surface of the salt.

DESCRIPTION OF THE DETAILED EMBODIMENTS OF THE INVENTION

As used herein, "cement" means any inorganic substance that is capable of setting and hardening with water, as a result of the interaction of water with the constituents of the substance, to act as a bonding agent for materials. By "cement" is meant to include the class of hydratable or hydraulic cements such as Portland cement, sorrel cement, calcium-aluminate cement, magnesia cement, gypsum cement and mason's cement.

As used herein, "hydratable cement" or "hydraulic cement" means self-curing cements which cure with water of hydration such as Sorrel cement, Portland Cement, Pozzolan cement and calcium aluminate cement.

As used herein, "Portland cement" means a mixture of limestone silica and clays which is calcined and then mixed with gypsum.

As used herein, "Sorrel cement" means a hydrated combination of $MgCl_2$ and MgO, $MgSO_4$ and MgO or $MgCl_2$ or $MgSO_4$. The ratio of $MgCl_2$ or $MgSO_4$ to MgO in Sorrel cement broadly is about 1:1 to about 1:30 (or 1:0.42 to 1:1:13 weight ratio). Sorrel cement can include a combination of $MgCl_2$, $MgSO_4$ and MgO with the $MgSO_4$ being at least partially interchangeable with $MgCl_2$.

As used herein, "calcined gypsum" means $CaSO_4 \cdot \frac{1}{2}H_2O$ and $CaSO_4$ in the form of Keene's cement which when combined with water, hydrates and forms hydrated gypsum or gypsum cement.

As used herein, "concrete" means a cementitious substance which is a mixture of cement, aggregate and water, and optionally, any additives, such as a drying enhancer or water repellant.

As used herein, "aggregate" means fly ash, sand, silica and any material derived from rock or manufactured from clays, shales, slates and slags.

As used herein, "water repellent" means any material that reduces the cover layer's permeability to and absorption of water.

As used herein, "water resistant" means the ability to repel water so as to minimize the passage of water therethrough.

The invention includes a salt mound having a water resistant cover layer comprising a cured foamed cover composition, a method for providing the foamed cover composition and covered salt piles and both the cured cover as well as the foamed cover composition (prior to curing). The cured foamed cover composition is a cementitious composition comprising cement, foaming composition and aggregate where the cover after curing has a thickness which is effective for maintaining the integrity of the salt mound for at least a year when exposed to outdoor elements and which is effective for minimizing passage of moisture to the salt for at least one year. The cured layer of foamed concrete generally will have a thickness of from about 0.1 to about 1.0 inch which will require that from about 0.5 to about 12 pounds of dry composition is applied to every square foot of salt surface.

The foamed cover composition has sufficient water to permit it to be spread by a hydraulic pump and/or an eductor and to permit it to cure into a solid, essentially impermeable, cover layer of cement or concrete.

Any foaming composition compatible with permitting the cement curing into a hardened cover may be used. Foaming agents include cationic surfactants, alkyl olefin sulfonates, alkali metal salts of alkyl ether sulfates, such as a sodium salt of an alkyl ether sulfate, and sodium lauryl sulfate.

The cured foamed cover composition which is applied to the salt pile comprises from about 2 to about 14 weight percent cement and amounts of foaming composition and aggregate which are effective for providing a cured foamed cover which has a density and a strength as previously described. Generally prior to curing, the uncured foamed cover composition will comprise from about 1 to about 12 weight percent cement, from about 0.2 to about 4 weight percent foaming composition, from about 54 to about 78 weight percent aggregate (based on the weights of cement, foaming composition and aggregate) and the remainder water.

In an important aspect, to increase water resistance of the cured cover layer, a water resistant additive also can be mixed with the aqueous foamed composition before it is applied to the salt mound. Alternatively, the water resistant additive composition may be applied over the cover layer after application of the aqueous foamed composition in an amount effective for providing water resistance to the surface of the cured salt cover. In general the water resistant additive when applied with the uncured foamed cover composition may comprise from about 0.3 to about 15 weight percent, based upon the weight of the dry cementitious composition. Any water resistant additive compatible with curing the foamed cover composition, or mixtures thereof, which are known to those skilled in the art can be used. Suitable additives include latexes available as Darex 526L (carboxylated styrene butadiene vinylidene chloride polymer); Versaflex 9 (vinylidene chloride butyl acrylate polymer); Daratak xb3631 (polyvinylidene chloride terpolymer); Darex (styrene butadiene itaconic acid polymer); Versaflex 1 (vinyl acetate butylacrylate-vinyl versate polymer); and Everflex GT (hexylene glycol vinyl acetate dibutylmaleate copolymer vinyl acetate monomer). The water resistant additives also may include soaps of fatty acids (such as alkali or alkaline metal salts of fatty acids) or fatty acids such as oleic acid, sodium oleate, calcium oleate, stearic acid; sodium stearate or calcium stearate. Aggregate materials such as fly ash and silica, such as silica available as Microsilica EMS 965 by Elkem Materials Inc. or Fumed Silica Aerosil R 972 by Degussa Corp. also may provide some water resistance. Other commercial additives may be used such as DAP Water Stop and Plug by D.A.P. Inc. and Akona Cement Waterproofer #1625 (Akona, Inc., 1570 Halfrin Road, Maple Plain, Minn. 55359). These suitable water-proofing solutions also may be sprayed onto the cured foamed cover to enhance the water resistant effect of the cover layer.

In yet another aspect, the foamed cover composition may include an accelerator to provide a quick curing cover layer. Calcium aluminum cement is a suitable accelerator and may be included in the dry component of the foamed cover composition in an amount of from about 1 weight percent to about 20 weight percent based upon the weight of the dry components composition.

According to the method of the invention, it is important that the salt mound be permitted to settle and shift for about three to seven days after the salt pile is created and before the cementitious composition is applied to the pile or mound. The foamed cover composition may be applied by an eductor sprayer with the sprayer being operated from a moveable "cherry picker" whereby an operator would aim a spray of the concrete over the bulk salt. Alternatively the foamed cover composition may be applied using a hydraulic pump with commercially available nozzles.

The following examples illustrate the invention and the method of the invention and should be understood to be illustrative of, but not limiting, upon the scope of the invention which is defined in the claims.

EXAMPLES

In each of the Examples below, the concrete is applied to provide a cure layer of about 0.5 inch. In each of the Examples, the concrete is applied over two mounds or piles of salt where one pile is covered using the dry application method and one pile is covered using the wet application method. In Examples where an additive is used, unless otherwise noted, the additive is mixed in with the concrete composition prior to application.

1. 0.2 to 4% oleic acid, 30–80%—10 U.S. mesh sand, 1–12% cement, 0.2 to 4%, Foamer such as Rheocell, Rheofill or Rheocell 15 and 10–40% water.
2. 0.2 to 4% stearic acid, 30–80%—10 U.S. mesh sand, 2–12% cement, 0.2 to 4%, Foamer such as Rheocell, Rheofill or Rheocell 15 and 10–40% water.
3. 0.5 to 3% latex such as Ever Flax GT, 30–80%—10 U.S. mesh sand, 1–12% cement, 0.2 to 4%, Foamer such as Rheocell, Rheofill or Rheocell 15 and 10–40% water.
4. 0.2 to 3.7 sodium oleate, 30–80%—10 U.S. mesh sand, 1–12% cement, 0.2 to 4%, Foamer such as Rheocell, Rheofill or Rheocell 15 and 10–40% water.
5. Any salt of a fatty acid or fatty acid, 30–80%—10 U.S. mesh sand, 1–12% cement, 0.2 to 4%, Foamer such as Rheocell, Rheofill or Rheocell 15 and 10–40% water.
6. 0.2 to 4% oleic acid, or 0.2 to 4% stearic acid, or 0.5 to 3% latex such as Ever Flat GT, or any salt of a fatty acid or fatty acid, or 0.2 to 3.7 sodium oleate, 30–80%, fly ash, 1–12% cement, 0.2 to 4%, Foamer such as Rheocell, Rheofill or Rheocell 15 and 10–40% water.

What is claimed is:

1. A method of protecting deicing salt which is stored outdoors in bulk mounds or piles from erosive elements, the method comprising covering the salt with an uncured foamed cover composition which after curing has a thickness which is effective for maintaining the integrity of the salt mount for at least a year when exposed to outdoor elements and provides a cured foamed cover which is effective for minimizing passage of moisture to the salt for at least one year, the uncured foamed cover composition comprising aggregate, foaming composition and from about 1 to about 12 weight percent cement, the amounts of aggregate and foaming composition effective for providing a cured cover composition with a density of not more than about 1.6 gram/cm$^3$, the cured foamed cover composition comprising cured cement, aggregate and a water resistant additive in an amount effective for increasing the water resistance of the cured cementitious composition, the aggregate having a particle size of not more than about 10 U.S. standard mesh.

2. A method as recited in claim 1 wherein the cured foamed cover composition as a density in the range of from about 1.6 to about 0.9 grams/cm$^3$.

3. A method as recited in claims 1 or 2 wherein the cured foamed cover composition has a thickness of from about 0.1 to about 1 inch.

4. A method as recited in claims 1 or 2 wherein the aggregate has a particle size of not more than about 10 U.S. standard mesh.

5. A method as recited in claim 3 wherein the aggregate has a particle size in the range of from about 10 U.S. standard mesh to about 300 U.S. standard mesh.

6. A method as recited in claims 1 or 2 wherein the cured foamed cover composition has a strength in the range of from about 28 to about 8.

7. A method as recited in claim 5 wherein the cured foamed cover composition has a strength in the range of from about 28 to about 8.

8. A method as recited in claims 1 or 2 wherein the method further comprises providing a mound or pile of salt and permitting the mound or pile of salt to settle for at least about three days before covering the salt with the cementitious composition.

9. A method as recited in claim 5 wherein the uncured foamed cover composition comprises at least about 54 weight percent aggregate.

10. A method of providing a cured foamed water resistant cover composition over bulk salt stored outdoors in mounds comprising:

applying an uncured foamed cover composition to provide a foamed layer over the salt, the uncured foamed cover composition comprising from about 2 to about 12 weight percent cement, from about 0.2 to about 4 weight percent foaming composition and from about 54 to about 78 weight percent aggregate, the aggregate having a particle size in the range of from about 10 U.S. standard mesh to about 300 U.S. standard mesh, the cement, foaming composition and aggregate being in amounts relative to one another which are effective for providing the cured foamed cover composition with a density of not more than about 1.6 gram/cm$^3$;

applying a water resistant additive with the uncured foamed composition or applying the water resistant additive to a cured or uncured foamed layer after application of the uncured composition; and allowing the uncured foamed layer to set for a time effective for curing the composition to provide the cured foamed water resistant cover composition over the salt.

11. A method as recited in claim 10 wherein the cured foamed water resistant cover composition has a thickness of from about 0.1 to about 1 inch.

12. A method as recited in claims 10 or 11 wherein the method further comprises providing a mound or pile of salt and permitting the mound or pile of salt to settle for at least about three days before covering the salt with the cementitious composition.

13. An uncured foamed cover composition comprising an aqueous blend of cement, aggregate, water resistant additive, and foaming composition which when cured is effective for maintaining the integrity of a mound bulk material, the uncured foamed cover composition comprising from about 1 to about 12 weight percent cement, the amounts of aggregate, water resistant additive and foaming composition effective for providing a cured foamed water resistant cover composition with a density of not more than about 1.6 gram/cm$^3$.

14. A foamed cover composition as recited in claim 13 wherein the uncured foamed cover composition comprises from about 0.2 to about 4 weight percent foaming composition and from about 54 to about 78 weight percent aggregate, the aggregate having a particle size in the range of from about 10 U.S. standard mesh to about 300 U.S. standard mesh.

15. A foamed cover composition as recited in claims 13 or 14 wherein the relative amounts of cement, aggregate and foaming composition are effective for providing a cured cover with a density in the range of from about 1.6 to about 0.9 grams/cm$^3$.

16. A cured foamed water resistant cover composition provided by spraying a foamed cover composition, the cured foamed cover composition comprising from about 2 to about 14 weight percent cement, from about 0.4 to about 6 weight percent foaming composition, from about 70 to about 97.6 weight percent aggregate, and a water resistant additive in an amount effective for increasing the water resistance of the cured cover composition, the aggregate having a particle size in the range of from about 10 U.S. standard mesh to about 300 U.S. standard mesh, the cured foamed cover composition having a density of at least about 1.6 gram/cm$^3$.

17. A cured foamed cover composition as recited in claim 11 wherein the cured cover composition has a density in the range of from about 1.6 to about 0.9 grams/cm$^3$ density.

18. A cured foamed cover composition as recited in claim 17 wherein the cured cover composition has a strength in the range of from about 28 to about 8.

19. A cured foamed cover compositions recited in claims 16 or 17 wherein the aggregate is selected from the group consisting of sand, fly ash and mixtures thereof.

20. A method as recited in claim 1 wherein the foaming composition includes a foaming agent selected from the group consisting of cationic surfactants, alkyl olefin sulfonates, and alkali metal salts of alkyl ether sulfates.

21. A method as recited in claim 10 wherein the foaming composition includes a foaming agent selected from the group consisting of cationic surfactants, alkyl olefin sulfonates, and alkali metal salts of alkyl ether sulfates.

22. A foamed cover composition as recited in claim 13 wherein the foaming composition includes a foaming agent selected from the group consisting of cationic surfactants, alkyl olefin sulfonates, and alkali metal salts of alkyl ether sulfates.

23. A foamed cover composition as recited in claim 16 wherein the foaming composition includes a foaming agent selected from the group consisting of cationic surfactants, alkyl olefin sulfonates, and alkali metal salts of alkyl ether sulfates.

24. A foamed cover composition as recited in claim 16 wherein the cured foamed water resistant cover composition has a thickness of from about 0.1 to about 1 inch.

25. A cured foamed water resistant cover composition provided by spraying a foamed cover composition, the cured foamed cover composition comprising from about 2 to about 14 weight percent cement, from about 0.4 to about 6 weight percent foaming composition, from about 70 to about 97.6 weight percent aggregate, the aggregate having a particle size in the range of from about 10 U.S. standard mesh to about 300 U.S. standard mesh, the cured foamed cover composition having a density of at least about 1.6 gram/cm$^3$, a thickness of not more than about 1 inch and a strength in the range of about 28 to about 8.

26. A foamed cover composition as recited in claim 25 wherein the foaming composition includes a foaming agent selected from the group consisting of cationic surfactants, alkyl olefin sulfonates, and alkali metal salts of alkyl ether sulfates.

* * * * *